United States Patent

Hale

[11] Patent Number: 5,981,413
[45] Date of Patent: Nov. 9, 1999

[54] ABRASIVE COMPOSITION

[75] Inventor: Roland D. Hale, Alfred Station, N.Y.

[73] Assignee: Howard J. Greenwald, Penfield, N.Y.

[21] Appl. No.: 09/109,556

[22] Filed: Jul. 2, 1998

[51] Int. Cl.$^6$ .................................................. C03C 10/00
[52] U.S. Cl. .............................. 501/32; 501/32; 501/155; 65/33.1; 65/134.8; 588/252; 588/256; 106/DIG. 1
[58] Field of Search ...................... 106/DIG. 1; 65/134.8, 65/33.1; 501/2, 155, 32; 588/252, 256

[56] References Cited

U.S. PATENT DOCUMENTS 5,434,333  7/1995  Jantzen et al. .............................. 588/3
5,558,690  9/1996  Hnat et al. .............................. 65/134.8

FOREIGN PATENT DOCUMENTS 289037    4/1991   Germany .
10152343  6/1998   Japan .
2078142   12/1995  Spain .

OTHER PUBLICATIONS

"Glassification of Electric Arc Furnace Dust" Ek et al. Iron Steel Eng (1993) 70 (4), pp. 82–84. (abstract only).

*Primary Examiner*—Paul Marcantoni
*Attorney, Agent, or Firm*—Howard J. Greenwald

[57] ABSTRACT

A glass-ceramic composition which is is crystallized in situ from a thermally crystallizable mixture containing from about 40 to about 80 weight percent of electric arc furnace dust and from about 10 to about 40 weight percent of glass. The composition has a Vickers hardness of at least about 5.5 gigaPascals, a Vickers fracture toughness of from about 0.6 to about 1.5 megaPascals.meters$^{0.5}$, and a density of from about 2.8 to about 4.1 grams per cubic centimeter; and it contains from about 20 to about 40 weight percent of an iron oxide. When the composition is tested in accordance with the Environmental Protection Agency's Toxicity Characteristic Leaching Procedure, it produces a leachate which contains no detectable mercury, no detectable barium, no detectable selenium, less than 0.2 parts per million of detectable lead, less than 0.5 parts per million of detectable chromium, less than 0.1 parts per million of detectable cadmium, less than 0.005 parts per million of detectable arsenic, and less than 0.04 parts per million of detectable silver.

17 Claims, 1 Drawing Sheet

ABRASIVE COMPOSITION

FIELD OF THE INVENTION

An abrasive composition made by a process in which from about 40 to about 80 weight percent of electric arc furnace dust and from about 10 to about 40 weight percent of glass are mixed in a ratio of from about 2/1 to about 4.5/1, melted at a temperature of from about 2400 to about 2900 degrees Fahrenheit, and then quenched.

BACKGROUND OF THE INVENTION

It is known that a ceramic material useful as an abrasive can be made from electric arc furnace dust. Thus, it is disclosed in U.S. Pat. No. 5,738,694 of George W. Ford, Jr., "EAF dust has also been processed by blending with silicate materials, such as silica sand, clay, or cullet, and heated in a furnace to form a vitrified ceramic product. The ceramic is useful as an abrasive . . . ."

The Ford patent does not disclose the physical and chemical properties of the abrasive material allegedly made by its process. However, in general, a commercially suitable abrasive with satisfactory hardness properties is not produced by this prior art process.

In fact, the abrasive produced by the process of the Ford patent apparently has little commercial value. Ford teaches that, although "The ceramic is useful as an abrasive, and the EAF dust is rendered nonhazardous," ". . . the valuable metals contained in the dust are not recovered" (see lines 31–37 of Column 3 of this patent). Clearly, the abrasive material made by the process of the Ford patent is not worth as much as its metal content.

It is an object of this invention to provide an abrasive material made from electric arc furnace dust which has a substantial commercial value which is greater than the value of the metals in the material.

It is another object of this invention to provide a magnetic abrasive material which can readily be collected by magnetic collection means.

SUMMARY OF THE INVENTION

In accordance with this invention, there is provided an abrasive material which preferably is made by a process in which from about 40 to about 80 weight percent of electric arc furnace dust and from about 10 to about 40 weight percent of glass are mixed in a ratio of from about 2/1 to about 4.5/1, melted at a temperature of from about 2400 to about 2900 degrees Fahrenheit, and then quenched.

BRIEF DESCRIPTION OF THE DRAWINGS

The invention will be illustrated by reference to this specification and the attached drawings, in which like reference numerals refer to like elements, and wherein.

DESCRIPTION OF THE PREFERRED EMBODIMENTS

Figure 1:
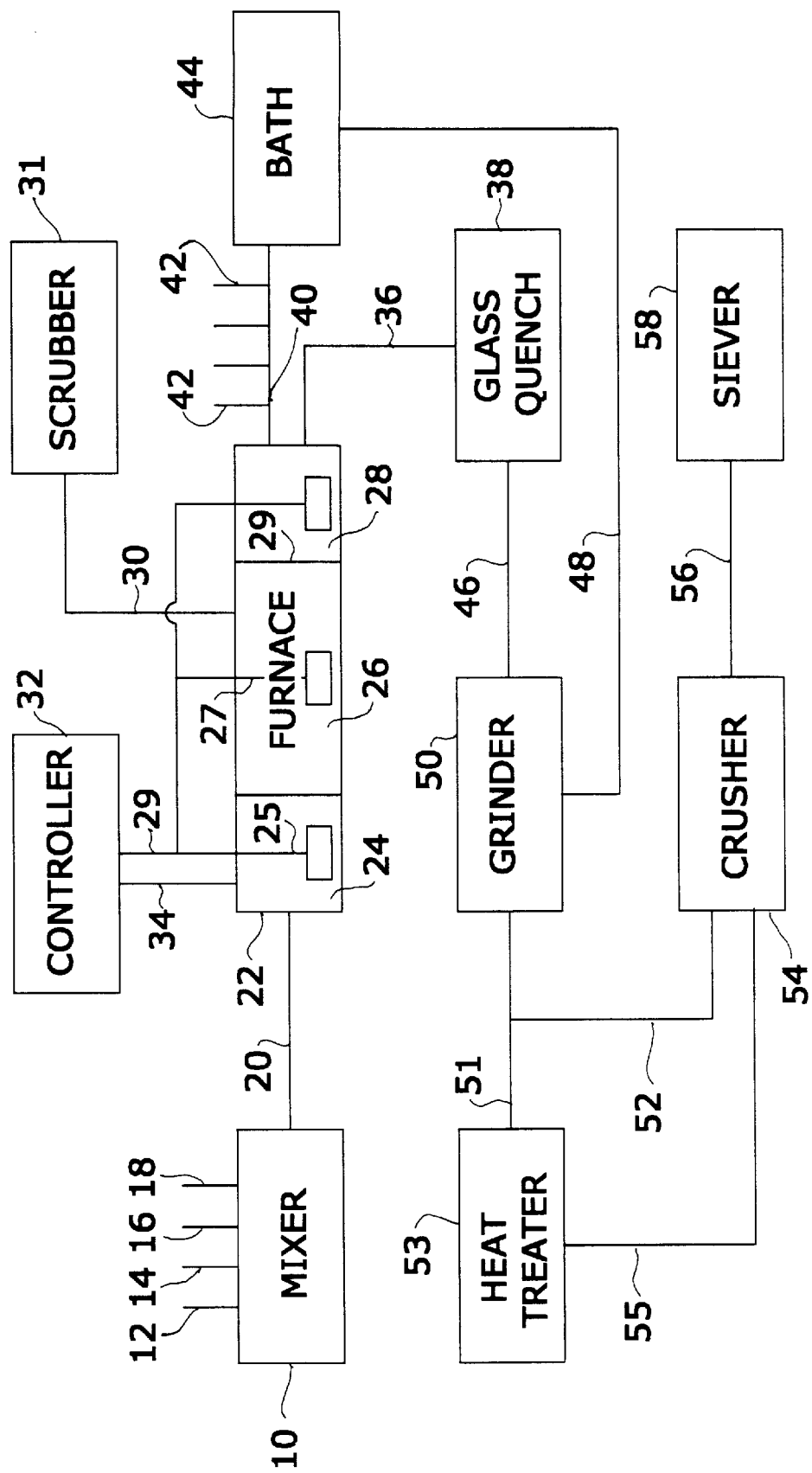
FIG. 1 is a flow diagram of a preferred process of the invention.

FIG. 1 is a flow diagram illustrating one preferred process of this invention. Referring to FIG. 1, a glass batch is produced by charging various reagents to mixer 10.

Electric arc furnace dust is charged to mixer 10 via line 12. As is disclosed in U.S. Pat. No. 5,738,694 of Ford et al., the entire disclosure of which is hereby incorporated by reference into this specification, "Electric arc furnaces typically melt scrap metal thorugh the use of high voltage electric current. The scrap metal may come from a variety of sources, including . . . discarded railroad rails, cut sheet steel, and scrap automobiles. The scrap metal is added to the electric arc furnaces without separating non-ferrous metals, such as lead, zinc, and cadmium. During the operation of the electric arc furnace, these non-ferrous metals are vaporized from the scrap, condensed into a dust from the waste gas stream, and are deposited in a bag house."

Electric arc furnace ("EAF") dust is well known to those skilled in the art and is described, e.g., in U.S. Pat. Nos. 5,738,684, 5,714,113, 5,698,759, 5,695,642, 5,667,553, 5,626,249, 5,605,640, 5,601,631, 5,599,378, 5,589,118, 5,569,152, 5,558,690, 5,557,031, 5,538,532, 5,470,375, 5,443,788, 5,443,614, 5,403,991, 5,372,630, 5,364,447, 5,338,336, 5,336,297, 5,302,341, 5,278,111, and the like. The disclosure of each of these United States patents is hereby incorporated by reference into this specification.

It is preferred that the EAF dust used in the process of this invention have a particle size distribution such that at least about 70 weight percent of its particles are smaller than about 20 microns. In another embodiment, at least about 80 weight percent of the EAF dust particles are smaller than about 20 microns.

The EAF dust used in the process of this invention typically contains from about 25 to about 35 weight percent of at least one iron oxide compound and, more preferably, from about 28 to about 33 weight percent of iron oxide. Thus, e.g., it may contain black iron oxide, such as, e.g., ferrosferric oxide, ferroferric oxide, iron oxide, magnetic, black rouge, and the like. Thus, e.g., it may contain hematite (also known as red iron ore, bloodstone, or iron oxide), which is a brilliant black to blackish red or red mineral with a density of from about 4.9 to about 5.3. Thus, e.g., it may contain the iron oxide identified as Chemical Abstracts number CAS 1309-37-1.

The EAF dust used in the process of this invention preferably contains from about 0.05 to about 5 weight percent of at least one oxide of chromium, also known as "chromic oxide" and, preferably, from about 0.05 to about 0.2 percent of at least one oxide of chromium. Thus, e.g., the chromic oxide may be chromium (III) oxide, chromia, chromium sesquioxide, green cinnabar, and the like. Without wishing to be bound to any particular theory, applicant believes that, during the process of this invention, the chromium molecules serve as crystallization sites for the spinels which form at the quench, thereby increasing the hardness of the abrasive formed.

The EAF dust used in the process of this invention can contain from about 3 to about 25 weight percent of zinc oxide, which is also known as "Chinese white" and "zinc white." In one embodiment, no zinc oxide is present in the EAF dust.

In one embodiment, the EAF dust used in the process is obtained from Nucor Steel Company of Armorel, Arkansas as "Steel Mill Electric Arc Funace Dust" ("Baghouse dust, K061). Thus EAF dust typically cotnains from 0 to 35 percent of calcium oxide, from 0 to 35 percent of iron oxide, from 0 to 25 percent of zinc oxide, from 0 to 15 percent of silica, from 5 to 10 percent of manganese oxide, from 5 to 10 percent of magnesium oxide, from 0 to 5 percent of alumina, from 0 to 5 percent of chromium oxide, from 0 to 5 percent of phosphorous pentoxide, from 0 to 5 percent of sulfur dioxide, from 0 to 5 percent of calcium oxide, from 0 to 5 percent of sodium fluoride, and from 0 to 5 percent of the oxides of copper, molybdenum, tin, vandium, cobalt, titanium, potassium, arsenic, barium, cadmium, lead, tungsten, mercury, nickel, selenium, silver, and the like.

Referring again to FIG. 1, glass is charged via line 14 to mixer 10. It is preferred that the glass so charged is crushed with a particle size distribution such that at least about 70 percent of its particles have a maximum dimension smaller than about 8.0 centimeters. It is even more preferred that glass used be glass cullet.

As is known to those skilled in the art, cullet is broken or reclaimed glass; it often is fragments of scrap glass for production operations which are collected and recylced. Glass cullet is well known and is described, e.g., in U.S. Pat. Nos. 5,620,491, 5,588,978, 5,578,102, 5,558,691, 5,556,443, 5,529,594, 5,524,837, 5,498,285, 5,460,638, 5,399,181, 5,350,118, 5,342,427, 5,125,943, 4,875,919, 4,797,092, 4,793,845, 4,781,742, 4,723,979, 4,696,690, 4,549,893, and the like. The disclosure of each of these United States patents is hereby incorporated by reference into this specification.

One preferred glass cullet is soda lime glass cullet of mixed chips from residential glass recycling plants; as is known to those skilled in the art, soda lime glasses contain silica, sodium oxide, and calcium oxide. Soda lime glass cullet material is well known and is commercially available; see, e.g., U.S. Pat. Nos. 5,731,367, 5,585,452, 5,563,232, 5,538,786, 5,468,432, 5,350,778, 5,028,569 (virgin soda lime glass cullet), 4,934,307, 4,541,842, and the like. The disclosure of each of these United States patents is hereby incorporated by reference into this specification.

Instead of using soda lime glass and/or soda lime glass cullet, one may additionally and/or alternatively use other glass compositions such as borosilicate glass, aluminosilicate glass, Vicor glass, fused silica glass, borax glass, transparent mirror glass, and the like. These and other glasses are descried on pages 376–382 of George S. Brady et al.'s "Materials Handbook," Thirteenth Edition (McGraw-Hill, Inc., New York 1991).

In one embodiment, the glass charged via line 14 contains from at least about 30 percent of silicon dioxide in the glass.

Regardless of which glass or glasses are used, it is preferred to charge from 10 to about 40 weight percent, by weight of total material in mixer 10, and more preferably from about 10 to about 30 weight percent of such glass is charged to the mixer 10. The EAF dust and the glass are charged so that their weight/weight ratio is from about 2.0/1 to about 4.5/1.

Referring again to FIG. 1, and in the preferred embodiment depicted therein, from about 0 to about 35 weight percent of silica sand can charged to mixer 10 via line 16; in a more preferred embodiment, from about 10 to about 30 weight percent of silica sand is charged. This silica sand preferably has a particle size distribution such that at least about 70 percent of its particles range in size from about 0.05 to about 2.0 millimeters.

In one preferred embodiment, where silica sand is charged to mixer 10, the composition of this invention contains from about 37 to 43 weight percent of silica.

Silica sand is well known to those skilled in the art and is described, e.g., in U.S. Pat. Nos. 5,613,453, 5,551,632, 5,492,548, 5,476,416, 5,472,500, 5,426,145, 5,411,352, 5,334,364, 4,401,638, 3,856,213, and the like. The disclosure of each of these United States patents is hereby incorporated by reference into this specification.

Referring again to FIG. 1, it will be seen that from about 0 to about 15 percent, and more preferably from 1 to about 10 weight percent, of glass flux material may be charged to mixer 10 via line 18. As is known to those skilled in the art, a flux is a substance added to a refractory material to aid in its fusion. One may use any of the conventional glass fluxes commonly available such as, e.g., the glass fluxes disclosed in U.S. Pat. Nos. 5,613,453, 5,551,632, 5,492,548, 5,476, 416, 5,472,500, 5,426,145, 5,411,352, 5,334,364, 4,401,638, 3,856,213, and the like. The entire disclosure of each of these United States patents is hereby incorporated by reference into this specification.

Other reagents also may be added to the glass batch in mixer 10. Thus, by way of illustration, one may charge from about 5 to about 10 weight percent of alumina, by total weight of material in the mixer and, more preferably, from about 5.5 to about 8.5 weight percent of alumina. In this embodiment, at least about 70 percent of the alumina particles are preferably smaller than 20 microns.

Referring again to FIG. 1, the glass batch from mixer 10 is conveyed via line 20 to furnace 22. Furnace 22 preferably has an elongated shape and is equipped with multi-zone temperature control.

In one preferred embodiment, furnace has a low velocity exhaust. Furnaces with low velocity exhaust are well known to those skilled in the art; see, e.g., U.S. Pat. No. 4,410,996, the entire disclosure of which is hereby incorporated by reference into this specification.

It is preferred, within furnace 22, to maintain the glass melt at a substantially constant shallow depth of from about 6 to about 12 inches; this is done to insure substantially that the same temperature will be found throughoutt the depth of the melt. Means for maintaining a melt at a shallow depth are well known to those skilled in the art and are described, e.g., in U.S. Pat. Nos. 4,289,571, 4,157,728, 4,002,468, 3,875, 322, 3,801,309, and the like. The disclosure of each of these United States patents is hereby incorporated by reference into this specification.

In the preferred embodiment illustrated illustrated in FIG. 1, furnace 22 is equipped with at least three heating zones, viz., heating zones 14, 26, and 28.

It is preferred to use heating zone 24 as a preheating zone. In this zone, the furnace temperature is maintained at from about 1,200 to about 2,600 degrees Fahrenheit; a sensor, such as sensor 25, preferably monitors the temperature within the glass batch. The glass batch is maintained in this zone until substantially all of it is melted.

The preheated glass batch is then subjected to a temperature of from about 2,300 to about 2,800 degrees Fahrenheit in melting zone 26; a sensor, such as sensor 27, monitors the temperature of the glass melt and determines when, in fact, it has been completely melted. The "soak time" during which the preheated glass batch is in the melting zone generally is from about 3 to about 5 hours and, more preferably, from about 3.5 to about 4.5 hours.

During the melting process, in zone 26, gases form which may include hazardous substances incorporated therein in liquid, vapor, or particulate form. Thus, gases such as chlorine, fluorine, sulfur dioxide, mercury, chromium, and the like may be evolved.

The off gases produced during the melting process are preferably passed via line 30 to scrubber 31, which is adapted to remove hazardous particulate liquid and vapor byproducts from the gas entering the scrubber. Such exhaust gas scrubbers are well known and are described, e.g., in U.S. Pat. No. 5,627,682 (scrubber for waste gas), U.S. Pat. No. 5,593,469 (exhaust gas scrubber), U.S. Pat. Nos. 5,540,760, 5,512,097, 5,505,752, 5,415,684, 5,009,511, and the like.

The disclosure of each of these United States patents is hereby incorporated by reference into this specification.

Referring again to FIG. 1, after the glass melt has been maintained in the melting zone 26 for the desired soak time, it is then passed to crystallization zone 28. In this crystallization zone, the glass melt is maintained in a substantially motionless state at a flow rate of less than about one inch per minute while being subjected to a temperature of from about 2,400 to about 2,900 degrees Fahrenheit. A sensor 29 is maintained in the glass melt to monitor the temperature within the glass melt. Each of sensors 25, 27, and 29 is operatively connected to controller which, via feedback line 34, is adapted to maintain the desired temperatures in zones 24, 26, and 28.

The partially crystallized melt from crystallization zone 28 is passed via line 36 to glass quencher 38. One may use any of the conventional glass quenching devices and processes known to those skilled in the art such as, e.g., the devices and processes disclosed in U.S. Pat. Nos. 5,556,444, 5,507,852, 5,498,275, 4,363,646, 5,769,918, 5,552,221, 4,617,043, and the like. The disclosure of each of these United States patents is hereby incorporated by reference into this specification.

It is preferred, when quenching the glass melt from furnace segment 28, that the temperature of the glass melt be reduced from its initial temperature (of from about 2,400 to about 2,900 degrees Fahrenheit) to a temperature of less than 500 degrees Fahrenheit in less than about 10 seconds. This can be accomplished by conventional quenching technology such as, e.g., the quenching systems described in the patents in the prior paragraph. Alternatively, or additionally, one may use other quenching means. Thus, by way of illustration and not limitation, one may withdraw molten glass from furnace segment 28 into a molten glass stream 40 and blast one or more streams 42 of water against the molten flow 40 at a high pressure of from about 40 to about 60 pounds per square inch. In this embodiment, it is preferred to have the source of the water (not shown) be disposed at from about 10 to about 18 inches from the molten glass stream 40. In this process, following such high pressure quenching, the quenched material drops into a quenching bath of hot or boiling water 44.

The quenched glass from either glass quench 38 and/or bath 44 is/are passed via lines 46 and/or 48 to grinder 50, in which the size of the quenched glass material is reduced so that substantially all of the glass particles have a largest dimension less than about 5 millimeters. It will be appreciated that the grinding can be conducted to produce other particle size distributions, both larger and smaller.

Conventional grinding means may be used. Thus, by way of illustration and not limitation, one may use a size reduction auger to produce the frit which passes through a United States number 4 sieve, or through any other desired sieve. Reference may be had to U.S. Pat. Nos. 5,600,425, 5,505, 388, and 5,419,102 for descriptions of size reduction augers; the disclosure of each of these United States patents is hereby incorporated by reference into this specification.

Referring again to FIG. 1, and in the preferred embodiment depicted therein, after the glass has been ground in grinder 50 to a size such that substantially all of its particles are smaller than about 5 millimeters, or to any other desired particle size distribution, the ground glass may then be passed via line 52 to crusher 54, in which the glass is crushed to desired sieve ranges.

In one embodiment, the glass is crushed so that the particles pass through a 20 mesh sieve (841 microns) but are retained on a 40 mesh sieve (420 microns); this is referred to as a 20/40 compact. In another embodiment, the glass is crushed so that the particles pass through an 80 mesh screen (177 microns) but are retained on a 120 mesh screen (125 microns); this is referred to as an 80/120 compact. In another embodiment, the glass is crushed so that the particles pass through a 20 mesh screen (841 microns) but are retained on a 30 mesh screen (595) microns; this is referred to as a 20/30 compact. In another embodiment, the glass is crushed so that the particles pass through a 40 mesh screen (420 microns) but are retained on a 60 mesh screen (250 microns); this is a 40/60 compact. In yet another embodiment, the glass is crushed so that the particles pass through a 120 mesh screen (125 microns) but are retained on a 200 mesh screen (74 microns); this is a 120/200 compact.

One may use any conventional glass crushing means. Thus, by way of illustration and not limitation, one may use one or more of the impact breakers described on pages 8-22 to 8-24 of Robert H. Perry et al.'s "Chemical Engineer's Handbook," Fifth Edition (McGraw-Hill Book Company, New York, 1973). Thus, e.g., one may use the glass crusher described in U.S. Pat. No. 5,361,913, the entire disclosure of which is hereby incorporated by reference into this specification.

In one alternative embodiment, illustrated in FIG. 1, prior to being fed to crusher 54, the ground material from grinder 50 is first passed via line 51 to heat treater 53. Applicant has found, unexpectedly, that heat treatment at this stage of the process substantially increases the hardness of the finished product. By comparison, when an identical heat treatment step is used after the material has been sieved, the abrasive composition turns into an unsuitable fine dust.

In heat treater 53, it is preferred to subject the ground material to a temperature of from about 740 to about 760 degrees Centigrade for about 2.5 to about 3.5 hours. The material is first raised from ambient to the soak temperature of 740–760 C. over a period of from about 3.5 to about 4.5 hours, held at the soak temperature for from about 2.5 to about 3.5 hours, and then cooled over a period of at least 7 hours.

In one embodiment, the furnace used for heat treater 53 is a 30 square foot shuttle furnace manufactured by the Frederick Kiln Company of Alfred Station, N.Y. This furnace contains an orifice metering system, a multiple burner flame supervisory system, valve actuators, gas regulators, and a turboblower, all of which are manufactured by the North American Inc. Manufacturing Company of 4455 East 71$^{st}$ Street, Cleveland, Ohio. The furnace is also eqipped with a Yokogawa Electric Program Controller, Model UP25, and a primary control manufactured by the Honeywell Corporation. The furnace also contains an ultraviolet flame detector manufactured by Honeywell.

The heat treated material from heat treater 53 is preferably passed via line 55 to crusher 54. The crushed material from crusher 54, is passed via line 56 to siever 58, wherein the crushed particles have been separated into various sieve sizes and/or compacts. One may use any of the sieving devices known to the art. Thus, for example, reference may be had to U.S. Pat. No. 5,524,837 for a description of a process in which glass cullet is crushed or comminuted and then sieved.

The novel abrasive composition of this invention

The first part of this specification has described the process used to prepare applicant's abrasive composition. This portion of the specification describes applicant's novel abrasive composition.

The composition of this invention is a glass ceramic composition. As used in this specification, the term "glass ceramic" refers to a hard, strong, nucleated glass with a nonporous, crystalline structure which has a high flexural strength and shock resistance. The glass ceramic of this invention is crystallized in situ from a thermally crystallizable glass batch comprising from about 40 to about 80 weight percent of electric arc furnace dust and from about 10 to about 40 weight percent of glass, wherein said electric arc furnace dust and said glass are in a weight/weight ratio of from about 2/1 to about 4.5/1.

The abrasive composition of this invention has a Vickers hardness of at least about 5.5 gigaPascals. It is preferred, however, that the composition of this invention have a Vickers hardness of at least about 6.5 gigaPascals.

Means for determining Vickers hardness are well known to those skilled in the art and are described, e.g., in U.S. Pat. Nos. 5,066,619, 5,028,567, 4,985,375, 4,861,657, 4,575,493, 3,657,780, and the like; the disclosure of each of these United States patents is hereby incorporated by reference into this specification. It is preferred to conduct hardness testing with a Vickers diamond indentor in open atmosphere conditions with a 200 gram load and 15 second dwell time.

The abrasive composition of this invention has a Vickers fracture toughness, as measured by the indentation technique, of from about 0.6 to about 1.5 megaPascals.meters$^{0.5}$. Means fore determining Vickers fracture toughness are well known and are described, e.g., in U.S. Pat. Nos. 5,769,176, 5,759,933, 5,658,837, 5,655,956, and the like; the disclosure of each of these United States patents is hereby incorporated by reference into this specification. It is preferred to use the indentation technique and to employ the direct crack method; toughness is preferably calculated with the relation developed by Anstis et al. (Journal of the American Ceramic Society, Volume 64, number 9, 1981).

The abrasive composition of this invention has a density of 2.8 to about 4.1 grams per cubic centimeter. This composition contains from about 20 to about 40 weight percent of iron oxide selected from the group consisting of ferrous oxide, ferric oxide, and mixtures thereof. In one preferred embodiment, the composition contains from about 33 to about 37 weight percent of such iron oxide.

In one embodiment, the abrasive composition of this invention is comprised of from about 0.05 to about 0.5 weight percent of potassium oxide and from about 2 to about 8 weight percent of calcium oxide.

The abrasive composition of this invention is environmentally safe; it does not exceed the United States Environmental Protection Agency's Leaching Procedure regulatory limits. As is known to those skilled in the art, the Environmental Protection Agency has published a test (at 40 Code of Federal Regulations [C.F.R.] 268.7[a]) for determining the leachability of hazardous substances in a material. In this test, approximately a 100 gram sample of the material is placed in a one liter glass jar which thereafter is filled with water, the jar is then rotated at 30 revolutions per minute for 18 hours, and the water in the jar is then tested for the presence of various elements. This test is well known and is described, e.g., in U.S. Pat. Nos. 5,769,961, 5,766,303, 5,762,891, 5,754,002, 5,744,239, and the like; the disclosure of each of these United States patents is hereby incorporated by reference into this specification.

When a 100-gram sample of the composition of this invention is tested for leachability in accordance with the aforementioned test, no mercury is detected in the water, less than about 0.2 parts per million of barium is detected in the water, no selenium is detected in the water, less than 0.2 parts per million of lead is detected in the water, less than 0.5 parts per million of chromium is detected in the water, less than 0.1 parts per million of cadmium is detected in the water, less than 0.005 parts per million of arsenic is detected in the water, and less than 0.04 parts per million of silver is detected.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

In one embodiment, the composition of this invention can be used as roofing granules. In this embodiment, it is preferred the particle sizes of the granules range from about 0.2 to about 2.0 millimeters. The roofing granules of this invention may replace prior roofing granules in such structures as those disclosed, e.g., in U.S. Pat. No. 5,516,573 (roofing granules embedded in asphalt), U.S. Pat. Nos. 5,382,449, 4,380,552, 5,206,068, and the like. The disclosure of each of these United States patents is hereby incorporated by reference into this specification.

In another embodiment, the composition of this invention can be used as a proppant; thus, it can be suspended in drilling fluid during the fracturing portion of the drilling operation to keep the fracture open when fluid is withdrawn. Thus, e.g., such composition may be used as a proppant in one or more of the applications disclosed in U.S. Pat. Nos. 5,620,049, 5,604,194, 5,597,043, 5,595,245, 5,582,250, 5,575,335, 5,562,160, 5,558,161, 5,531,274, 5,515,920, and the like. The disclosure of each of these United States patents is hereby incorporated by reference into this specification. In one aspect of this embodiment, the particle size of the proppant particles used is from about 0.2 to about 3.0 millimeters.

In another embodiment, the composition of this invention can be used to manufacture foam glass. As is known to those skilled in the art, foam glass is a light, black, opaque cellular glass made by adding powdered carbon to crushed glass and firing the mixture. Thus, one may use the composition of this invention in one or more of the processes or structures described in U.S. Pat. No. 5,069,960 (foam glass tile), U.S. Pat. No. 5,990,398 (foam glass tile), U.S. Pat. No. 4,833,015 (multilayer foam glass structure), U.S. Pat. No. 4,798,758 (foam glass with crust layer), U.S. Pat. Nos. 4,703,019, 4,430,108, 4,430,107, 4,124,365, 4,038,063, 4,024,309 (foam glass structural element), U.S. Pat. Nos. 3,975,174, 3,951,632, 3,811,851, 3,767,377, and the like. The disclosure of each of these United States patents is hereby incorporated by reference into this specification.

In one preferred embodiment, the composition of this patent is used to make foam glass structural elements or foam glass panels, such as those described in U.S. Pat. Nos. 4,024,309, 5,464,114, 4,557,090, 4,463,043, 3,628,937, and the like. The disclosure of each of these United States patents is hereby incorporated by reference into this specification.

I claim:

1. A glass-ceramic composition, wherein said glass-ceramic composition is crystallized in situ from a thermally crystallizable mixture comprising from about 40 to about 80 weight percent of electric arc furnace dust, and from about 10 to about 40 weight percent of glass, wherein:

(a) from about 2 to about 4.5 parts, by weight, of said electric arc furnace dust are present for each part of said glass present in said mixture, (b) said electric arc furnace dust has a particle size distribution such that at least about 70 weight percent of its particles are smaller than about 20 microns, (c) said electric arc furnace dust comprises from about 25 to about 35 weight percent of at least one iron oxide compound, (d) said glass-ceramic composition has a Vickers hardness of at least about 5.5 gigaPascals, a Vickers fracture toughness of from about 0.6 to about 1.5 megaPascals.meters$^{0.5}$, and a density of from about 2.8 to about 4.1 grams per cubic centimeter, (e) said glass-ceramic composition contains from about 20 to about 40 weight percent of an iron oxide selected from the group consisting of ferrous oxide, ferric oxide, and mixtures thereof, and (f) said composition, when it is tested in accordance with the Environmental Protection Agency's toxicity characteristic leaching procedure published at 40 Code of Federal Regulations 268.7(a), produces a leachate which contains no detectable mercury, less than about 0.2 parts per million of detectable barium, no detectable selenium, less than 0.2 parts per million of detectable lead, less than 0.5 parts per million of detectable chromium, less than 0.1 parts per million of detectable cadmium, less than 0.005 parts per million of detectable arsenic, and less than 0.04 parts per million of detectable silver.

2. The glass-ceramic composition as recited in claim 1, wherein said thermally crystallizable mixture comprises from about 10 to about 30 weight percent of silica sand.

3. The glass-ceramic composition as recited in claim 1, wherein said thermally crytallizable mixture comprises from about 5 to about 10 weight percent of alumina.

4. The glass-ceramic composition as recited in claim 1, wherein said electric arc furnace dust has a particle size distribution such that at least about 80 percent of its particles are smaller than about 20 microns.

5. The glass-ceramic composition as recited in claim 1, wherein said electric arc furnace dust is comprised of from about 28 to about 33 percent of at least one iron oxide compound.

6. The glass-ceramic composition as recited in claim 1, wherein said electric arc furnace dust is comprised of from about 0.05 to 5.0 weight percent of at least one oxide of chromium.

7. The glass-ceramic composition as recited in claim 1, wherein said electric arc furnace dust is comprised of from about 3 to about 25 weight percent of zinc oxide.

8. The glass-ceramic composition as recited in claim 1, wherein said glass is soda-lime glass.

9. The glass-ceramic composition as recited in claim 1, wherein said glass is comprised of at least about 30 weight percent of silicon dioxide.

10. The glass-ceramic composition as recited in claim 1, wherein said thermally crytallizable mixture is comprised of from about 1 to about 10 weight percent of glass flux material.

11. The glass-ceramic composition as recited in claim 1, wherein said composition is in the form of a 20/40 compact.

12. The glass-ceramic composition as recited in claim 1, wherein said composition is in the form of a 80/120 compact.

13. The glass-ceramic composition as recited in claim 1, wherein said composition is in the form of a 20/30 compact.

14. The glass-ceramic composition as recited in claim 1, wherein said composition is in the form of a 40/60 compact.

15. The glass-ceramic composition as recited in claim 1, wherein said composition is in the form of a 120/200 compact.

16. The glass-ceramic composition as recited in claim 1, wherein said composition is comprised of from about 0.05 to about 0.5 weight percent of potassium oxide.

17. The glass-ceramic composition as recited in claim 1, wherein said composition is comprised of from about 2 to about 8 weight percent of calcium oxide.

* * * * *